United States Patent [19]

Kozlovsky et al.

[11] Patent Number: 5,339,003
[45] Date of Patent: Aug. 16, 1994

[54] LASER SCREEN FOR A CATHODE-RAY TUBE

[75] Inventors: Vladimir I. Kozlovsky; Alexander S. Nasibov; Yan K. Skasyrsky, all of Moscow, U.S.S.R.

[73] Assignees: Principia Optics, Inc., Los Angeles, Calif.; P.N. Lebedev Institute of Physics, Moscow, U.S.S.R.

[21] Appl. No.: 902,008

[22] Filed: Jun. 22, 1992

[51] Int. Cl.$^5$ .................. H01J 29/10; H01L 21/302
[52] U.S. Cl. ................................ 313/463; 313/474; 437/225
[58] Field of Search .............. 313/463, 474; 372/36, 372/34; 156/272.8; 437/225, 5, 7; 148/DIG. 138

[56] References Cited

U.S. PATENT DOCUMENTS

| | | |
|---|---|---|
| 2,911,557 | 11/1959 | Mollen et al. |
| 2,954,499 | 9/1960 | Gundert et al. |
| 2,975,326 | 3/1961 | Burn . |
| 3,182,224 | 5/1965 | Stone et al. |
| 3,267,209 | 8/1966 | Nagamori et al. |
| 3,316,432 | 4/1967 | Smith . |
| 3,558,956 | 1/1971 | Bosev et al. ........................ 313/421 |
| 3,575,627 | 4/1971 | Nicoll ................................ 313/467 |
| 3,936,693 | 2/1976 | Parks et al. ........................ 313/427 |
| 3,959,584 | 5/1976 | Todd ................................ 313/465 |
| 3,986,194 | 10/1976 | Matsumoto et al. ................ 372/44 |
| 3,996,492 | 12/1976 | McCroddy .......................... 372/44 |
| 4,099,092 | 7/1978 | Bristow ............................. 315/10 |
| 4,140,941 | 2/1979 | Uemura ............................. 313/495 |
| 4,160,935 | 7/1979 | Groot et al. ....................... 315/370 |
| 4,291,256 | 9/1981 | Garwin .............................. 315/368 |
| 4,456,853 | 6/1984 | Robinder et al. .................. 313/421 |
| 4,479,222 | 10/1984 | Hawrylo ............................ 372/45 |
| 4,523,212 | 6/1985 | Hawrylo ............................ 372/44 |
| 4,539,687 | 9/1985 | Gordon et al. ..................... 331/1 A |
| 4,565,947 | 1/1986 | Minn ................................. 313/467 |
| 4,571,727 | 2/1986 | Nishizawa et al. ................. 372/4 |
| 4,626,739 | 12/1986 | Shmulovich ....................... 313/469 |
| 4,634,922 | 1/1987 | Nill .................................. 313/402 |
| 4,695,332 | 9/1987 | Gordon et al. ..................... 437/126 |
| 4,701,789 | 10/1987 | Bonye ............................... 348/816 |
| 4,706,253 | 11/1987 | Su et al. ............................ 372/44 |
| 4,714,956 | 12/1987 | Yin .................................. 348/777 |
| 4,749,907 | 6/1988 | Boatwright et al. ................ 315/10 |
| 4,812,713 | 3/1989 | Blachard ........................... 315/370 |
| 4,813,049 | 3/1989 | Becla ................................ 372/44 |
| 4,894,832 | 1/1990 | Colak ................................ 372/44 |
| 4,945,223 | 7/1990 | Beauzamy ......................... 250/214 VT |
| 4,955,031 | 9/1990 | Jain .................................. 372/45 |
| 4,978,202 | 12/1990 | Yang ................................. 359/63 |
| 5,055,737 | 10/1991 | Murata et al. ..................... 313/474 |
| 5,254,502 | 10/1993 | Kozlovsky ......................... 437/225 |

FOREIGN PATENT DOCUMENTS 149738 7/1981 Fed. Rep. of Germany .
2080609 7/1981 United Kingdom .

OTHER PUBLICATIONS

A. Nasibov, Laser Cathode Ray Tubes and Their Applications SPIE vol. 893 High Power Laser Diodes and Appl., 1988, pp. 200–202.
A. S. Nasibov and E. S. Schemuck, Use of Laser Electron-Beam Tubes In Projection Television, Sov. J. Quantum Electron, Sep. 1978, pp. 1080–1085.

*Primary Examiner*—Donald J. Yusko
*Assistant Examiner*—Vip Patel
*Attorney, Agent, or Firm*—Marshall Lerner

[57] ABSTRACT

A heat removing support member connected to an output mirror of an optical cavity of a cathode-ray tube has microscopic roughness of its surface facing towards the screen.

5 Claims, 1 Drawing Sheet

LASER SCREEN FOR A CATHODE-RAY TUBE

FIELD OF THE INVENTION

The invention relates to electronic equipment. More particularly, the invention deals with a laser screen for a cathode ray tube and a method for making a laser screen for a cathode-ray tube in which laser radiation is generated at any point of a laser screen upon which an electron beam is incident. The invention may be used in high-brightness kinescopes and in particular in projection TV systems.

BACKGROUND OF THE INVENTION

Prior art laser screens for a cathode-ray tube have semiconductor members with a reflecting coating, a cementing layer, and a transparent heat removing support with a partly transparent mirror (Ulasyuk, V. N. Kvantoskopy. [Laser Screen Cathode-Ray Tubes]. Moscow. "Radio i Svyaz" Publishing House. 1988. pp. 151-155). The cementing layer of this laser screen is located between the mirror layers so that an interface boundary extends between the semiconductor member and the cementing layer, and a partial reflection of the generated radiation from this boundary occurs.

The main disadvantage of this laser screen resides in non-uniform lasing which causes an interference pattern. This non-uniform lasing is due to the fact that generation threshold and lasing power depend on the cementing layer thickness. To avoid such non-uniformity of lasing, it is necessary that fluctuations of the layer thickness over the screen surface area, which is over 20 sq. cm, be substantially smaller than the screen lasing wavelength in this layer ($<\lambda/(4\cdot N_c) \approx 0.08$ μm for green light) which is practically impossible.

Another prior art laser screen for a cathode-ray tube has a semiconductor member having mirror coatings and cemented to a transparent heat removing support (Koslovsky, V. I. et al. Laser Screen of CdS, CdSSe, ZnSe. Monocrystalline Ingots Moscow. J. Kvantovaya Elektronika. 1977. Vol. 4. No. 2. p. 351). The cementing layer of this device is outside an optical cavity formed by the mirror coatings. The reflectivity of a planar wave reflected from the boundary between the cementing layer and the support is generally lower than that for the boundary between the semiconductor member and the cementing layer in the above-cited prior art laser screen. This prior art laser screen also has non-uniformity caused by dependence of generation threshold and lasing power on thickness of the cementing layer although fluctuations of the lasing power and generation threshold are lower than in the prior art device referred to above.

Attempts have been made to use a transparent heat removing support with an antireflection coating (Ulasyuk, V. N. Kvantoskopy. [Laser Screen Cathode-Ray Tubes]. Moscow. "Radio i Svyaz" Publishing House. 1988. pp. 157). The antireflection coating in this prior art laser screen was provided to prevent reflection from the boundary between the cementing layer and the support. It is, however, not possible to completely suppress reflection because of a very limited range of materials for making antireflection coatings which must have a fair adhesion to the support and an appropriate index of refraction. This is also difficult because the indices of refraction of the cementing layer and support depend on temperature, elastic stresses and quality of polish of the support. It should be noted that it is very difficult to achieve high polish of the support taking into account high hardness of materials generally used for making transparent heat removing support for laser screens (leucosapphire, garnet, etc.).

SUMMARY OF THE INVENTION

It is an object of the invention to provide a surface for attachment of a heat removing support in a laser screen which ensures uniformity of lasing.

Another object of the invention is to simplify the laser screen and to facilitate its manufacture.

These and other objects are accomplished in a laser screen for a cathode-ray tube having a semiconductor member with a pair of mirrors forming an optical cavity and a transparent heat removing support attached to one of the mirrors and having its connection side facing towards the optical cavity which is made with a roughness formed by surface irregularities. The arithmetic mean of distances between adjacent individual irregularities and RMS deviation of a dimension of individual irregularities in the direction of an electron beam path do not substantially exceed a pixel size.

It should be noted that the arithmetic mean of the distances between adjacent individual irregularities may be different along different directions on the connection side of the transparent heat removing support. In particular these irregularities may be only along one direction. Moreover the connection side of the support may have any regular relief. The individual element of this relief may have a triangular form for example. In this case a period of this relief and a height of this triangle (analog of RMS deviation) does not substantially exceed a pixel size, but the manufacturing of a regular relief is more complicated.

This construction of the laser screen has a number of advantages without affecting quality of image since the size of elements of a microscopic roughness produced on the surface of the support is smaller than the size of one pixel. The pixel size is determined by the size of an electron beam spot on the screen. At the same time, roughness of the surface allows less stringent requirements to be imposed upon uniformity of thickness of a connecting layer between the support and the active components of the laser screen.

With this construction of the laser screen even fluctuations of thickness of the connecting layer up to several micrometers do not affect uniformity of lasing. This is due to the fact that roughness on the connection side of the support causes partial diffusion of the radiation reflected from this side thus ruling out interference that can be otherwise induced by the boundary between the connection side of the support and connecting layer. It should be noted that it is very easy to produce a rough surface on the connection side. An operation aimed at producing such rough surface is practically always performed before polishing the support in the manufacture of prior art laser screens. For example, a necessary rough surface may be made by means of a usual diamond powder grinding. It is preferred to use a diamond grain size of 3 μm to 10 μm in diameter. Therefore, the invention allows an expensive and complicated polishing operation to be dispensed with. It will be apparent that the use of a support with a rough surface allows advantages of this invention to be achieved both as regards image quality and facilitated manufacture.

It is preferred that an RMS deviation σ of the above-mentioned dimension of individual irregularities in the direction of the electron beam path comply with the following conditions:

$$\lambda/(8\cdot N_c) < \sigma < \lambda/(4\cdot N_n\cdot(N_n-N_c)),$$

wherein:

λ is the screen radiation wavelength;
$N_c$ is the index of refraction of the connecting layer;
$N_n$ is the index of refraction of the support.

The same conditions should be met in making a choice of tooling and processes for grinding and treatment of the support.

If the arithmetic mean of the distances between adjacent individual irregularities and RMS deviation of a dimension of individual irregularities in the direction of an electron beam path are not less than 0.3 μm that these values may be measured by an optical microscope. Values less than 0.3 μm may be determined from the measuring of a mirror component of reflection R from a rough-surface support. It is well known that this component is determined from the equation:

$$R = R_o \exp[(-2\pi\sigma/\lambda)^2]$$

wherein $R_o$ is a mirror component of reflection if σ=0. In any case the arithmetic mean and RMS deviation may be measured by means of a scanning electron microscope.

If $\sigma > \lambda/(8\cdot N_c)$, mirror reflection of the generated radiation from the connecting layer and support interface is ruled out so that lasing power does not depend on thickness of the connecting layer and non-uniformity of lasing is eliminated.

On the other hand, if the condition $\sigma < \lambda/(4\cdot N_n\cdot(N_n-N_c))$ is not met, the fraction of directional radiation at the output of the laser screen substantially decreases. This is critical for projection TV systems since quality of image becomes poorer because of a lower brightness and a decay of contrast.

DESCRIPTION OF THE DRAWINGS

The invention will now be described with reference to specific non-limiting embodiments illustrated in the accompanying drawings, in which.

DESCRIPTION OF PREFERRED EMBODIMENTS

Figure 1:
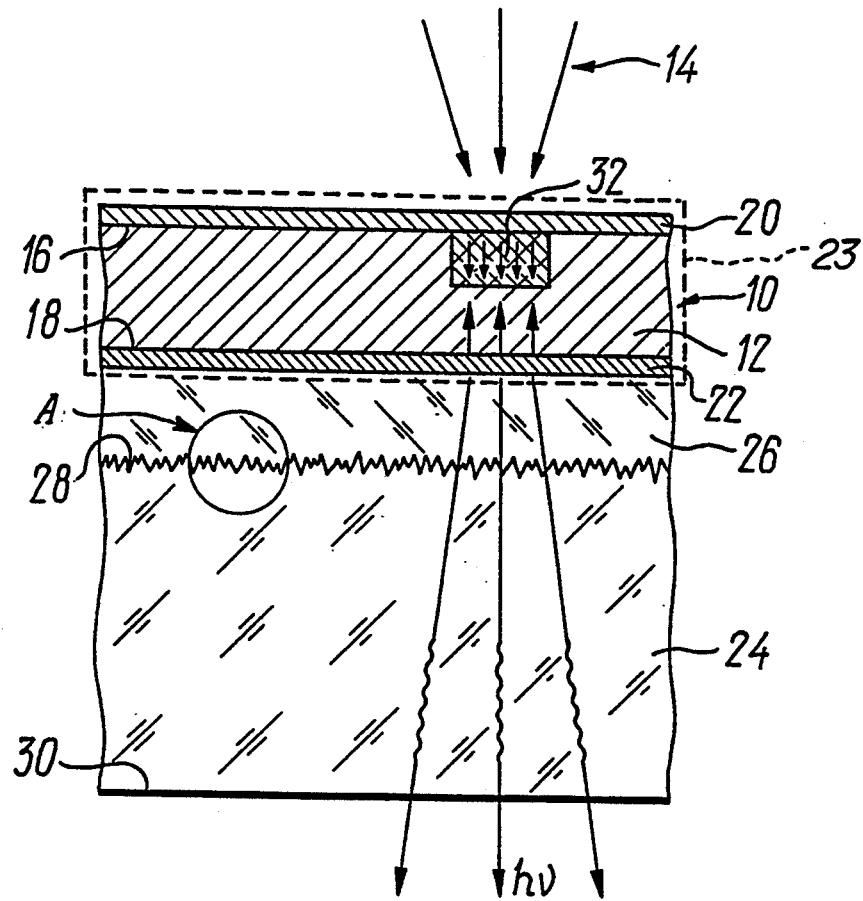
FIG. 1 diagrammatically shows a sectional view of a laser screen according to the invention.

With reference to FIG. 1 it can be seen that a laser screen according to the invention has a semiconductor member 12 comprising a single-crystal wafer, e.g., of $CdS_xSe_{1-x}$. Electron beam 14 is incident upon this semiconductor member which has opposite sides 16 and 18 extending downstream each other in the direction of the electron beam. Mirrors 20 and 22 are deposited on opposite sides 16 and 18 to form an optical cavity 23 in which semiconductor member 12 is an active component.

It should be noted that mirror 20 is a reflecting mirror and mirror 22 is a partly transparent mirror which may have a transmission ratio of about 10%. A heat removing transparent support 24 is attached to mirror 22 by means of a connecting cement layer 26. A side 28 of support 24, which is a connection side, is made with roughness, and an opposite side 30 of the support is polished.

Figure 2:
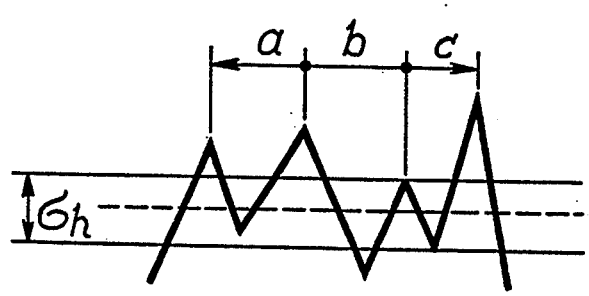
FIG. 2 shows an enlarged detail of FIG. 1 illustrating roughness of a support.

With reference to FIG. 2, an enlarged detail A of FIG. 1 shows that the rough surface of side 28 has irregularities spaced at distances "a", "b", "c", etc. from one another. The height of these surface irregularities, or their dimension in the direction of electron beam path 14 is characterized by RMS deviation σ. The arithmetic mean of the distances "a", "b", "c", etc. between adjacent surface irregularities and RMS deviation σ substantially should not exceed a pixel size. The pixel size is determined by the size of an electron beam spot on the laser screen which is generally about 10 to 15 μm.

In operation of the above-described laser screen electron beam 14 penetrates semiconductor member 12 to excite it, and lasing is caused within an electron spot. It should be noted that a positive feedback occurs in this generator only through reflection of a part of the generated radiation from mirrors 20 and 22. The interface between the connecting layer and support does not make any remarkable contribution to the positive feedback. The generated radiation hν which passes through the connecting layer and support interface is not substantially diffused in the direction of emergence from the support and form only a weak diffuse reflected radiation. When an electron spot moves across the screen, the lasing area follows up the spot, and lasing power does not depend on thickness of the connecting layer.

A pilot sample of a laser screen was made with the use of the following materials. The semiconductor member was in the form of a single-crystal wafer of $CdS_xSe_{1-x}$ 50 mm in diameter for lasing at 610 nm. Thickness of the semiconductor member in the screen was 30 μm, and the wafer sides were mechanically and chemically polished. Reflecting silver mirror 20 was deposited on the wafer on the side of incidence of electron beam 14, and a six-layer partly transparent mirror consisting of alternating quarter-wave layers of $ZrO_2$ and $SiO_2$ was formed on the opposite side. An optical epoxy cement OK-72F(Russian name) was used for forming the connecting layer with $N_c=1.53$. An average thickness of the connecting layer was 10 μm. A support was made of leucosapphire in the form of a disc 60 mm in diameter and 12 mm thick. The disc was ground on the connection side and polished on the opposite side where $N_n=1.715$. RMS deviation of heights of microscopic irregularities of the ground surface of the support was σ=0.2 μm with an arithmetic mean spacing of individual irregularities in a transverse direction with respect to electron beam 14 was of 0.3 μm. $\lambda/(8\cdot N_c)=0.05$ μm, and $\lambda/(4\cdot N_n\cdot(N_n-N_c))=0.5$ μm since a pixel size was 10 to 15 μm, and all conditions were met to ensure lasing uniformity and high brightness and lasing power. This laser screen was used in a detachable cathode-ray tube for tests with an energy of electrons of 50 to 75 keV, electron spot diameter of 15 to 50 μm and a current of up to 1 mA in a line raster scan mode with TV standard. The screen temperature ranged from 80 to 300 K. The tests showed high uniformity of lasing and complete absence of interference pattern over the whole range of temperature, spot diameter and electron energy.

Tests were also conducted with supports having a roughness close to the wavelength of radiation, and high uniformity of lasing was observed in all tests. At the same time, the directional pattern was worse with $\sigma$ close to the lasing wavelength.

Non-limiting explanatory specific embodiments of the invention have been described above. It is understood that various modifications and supplements may be made by those skilled in the art. Thus different semiconductor materials may be used, and materials other than leucosapphire can be used for making supports. All such modifications and supplements do not go beyond the spirit and scope of the invention as defined in the attached claims.

We claim:

1. A laser screen comprising;
    an optical cavity having a first reflecting mirror positioned on one side of said cavity and a second partly transparent mirror having two surfaces positioned on the opposite side of said optical cavity,
    a semiconductor member capable of lasing under the effect of an external excitation and having two opposite sides whereby optical radiation emerges through at least one of said two sides with one surface of said reflecting mirror positioned against one side of said semiconductor member and the first surface of said partly transparent mirror positioned against the other side of said semiconductor member; and
    a transparent heat removing support having a connection side connected to said optical cavity;
    whereby said connection side of said support has a roughness formed by surface irregularities, and the arithmetic mean of distances between adjacent individual irregularities and RMS deviation of a dimension of said individual irregularities in the direction of the light output do not exceed a pixel size.

2. The laser screen of claim 1 and wherein said heat removing support is connected to the second surface of said partly transparent mirror.

3. The laser screen of claim 2, wherein an RMS deviation $\sigma$ of said dimension of said individual irregularities in the direction of said path of light output complies with the following condition:

$$\lambda/(8 \cdot N_c) < \sigma < \lambda/(4 \cdot N_n \cdot (N_n - N_c)).$$

wherein
    $\lambda$ is the screen radiation wavelength;
    $N_c$ is the index of refraction of said connecting layer
    $N_n$ is the index of refraction of said support.

4. The device as described in claim 1 wherein the laser screen is used as a screen for a cathode-ray tube and wherein the excitation thereof is via an electron beam.

5. A laser screen comprising:
    an optical cavity having a first reflecting mirror positioned on one side of said cavity and a second partly transparent mirror having two surfaces positioned on the opposite side of said optical cavity;
    a semiconductor member capable of lasing under the effect of an external excitation and having two opposite sides whereby optical radiation emerges through at least one of said two sides with one surface of said reflecting mirror positioned against one side of said semiconductor member and the first surface of said partly transparent mirror positioned against the other side of said semiconductor member;
    a transparent heat removing support having a connection side connected to the second side of the partly transparent mirror by a connecting layer; and,
    whereby said connection side of said support has a roughness formed by surface irregularities, and the arithmetic mean of distances between adjacent individual irregularities does not exceed a pixel size, and R.M.S. deviation $\sigma$ of a dimension of said irregularities in the direction of the light output does not exceed said pixel size and complies with the following condition:

$$\lambda/8 \cdot N_c < \sigma < \lambda/(4 \cdot N_n \cdot (N_n - N_c))$$

wherein
    $\lambda$ is the screen radiation wavelength;
    $N_c$ is the index of refraction of said connecting layer;
    $N_n$ is the index of refraction of said support.

* * * * *